United States Patent
Robinson et al.

(10) Patent No.: US 11,157,604 B2
(45) Date of Patent: *Oct. 26, 2021

(54) BIOMETRIC AUTHENTICATED CONTENT

(71) Applicants: Christopher Michael Robinson, Poway, CA (US); David Andrew Elston, Poway, CA (US)

(72) Inventors: Christopher Michael Robinson, Poway, CA (US); David Andrew Elston, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,882

(22) Filed: Jun. 7, 2019

(65) Prior Publication Data

US 2019/0286802 A1    Sep. 19, 2019

Related U.S. Application Data

(63) Continuation of application No. 15/177,758, filed on Jun. 9, 2016, now Pat. No. 10,360,358.

(51) Int. Cl.
| | |
|---|---|
| *G06F 21/32* | (2013.01) |
| *H04W 12/02* | (2009.01) |
| *H04L 29/06* | (2006.01) |
| *H04W 12/065* | (2021.01) |
| *H04W 88/02* | (2009.01) |

(52) U.S. Cl.
CPC .......... *G06F 21/32* (2013.01); *H04L 63/0861* (2013.01); *H04W 12/02* (2013.01); *H04W 12/065* (2021.01); *H04W 88/02* (2013.01)

(58) Field of Classification Search
CPC ...... G06F 21/32; G06F 21/60; G06F 21/6245; G06F 21/30; H04L 63/0861; H04W 12/02; H04W 12/06; H04W 12/0605

USPC .......... 726/4–5, 7, 26; 713/168, 186
See application file for complete search history.

(56) References Cited

U.S. PATENT DOCUMENTS

| | | | |
|---|---|---|---|
| 7,558,965 B2* | 7/2009 | Wheeler | H04L 9/3231 340/5.82 |
| 9,392,460 B1* | 7/2016 | Blake | H04W 4/029 |
| 9,602,483 B2* | 3/2017 | Slaby | H04L 63/0861 |
| 9,721,107 B2* | 8/2017 | Han | G06F 21/32 |
| 2006/0044107 A1* | 3/2006 | Krygeris | G07G 1/0027 340/5.52 |
| 2014/0059675 A1* | 2/2014 | Batie, Jr. | G06F 21/32 726/19 |

(Continued)

*Primary Examiner* — Samson B Lemma
(74) *Attorney, Agent, or Firm* — Young Basile Hanlon & MacFarlane, P.C.

(57) ABSTRACT

A method for biometric authentication has the steps of sending a confidential communication to an intended recipient through the system, the intended recipient providing one or more biometric identifiers to view the communication, wherein the one or more biometric identifiers are unique to the intended recipient, the system verifying the one or more biometric identifiers against one or more stored biometric identifiers, the system accepting the one or more biometric identifiers further has the steps of the system displaying the confidential communication on the mobile device, and the user continues to provide the one or more biometric identifiers, the system continuously verifying the one or more biometric identifiers while the communication is displayed wherein when the verification is uninterrupted of fails the communication is hidden.

20 Claims, 2 Drawing Sheets

(56) References Cited

U.S. PATENT DOCUMENTS

| | | | | |
|---|---|---|---|---|
| 2015/0046711 A1* | 2/2015 | Slaby | ................. | H04L 63/10 |
| | | | | 713/170 |
| 2015/0278805 A1* | 10/2015 | Spencer, III | ....... | G06Q 20/3278 |
| | | | | 705/44 |
| 2015/0332273 A1* | 11/2015 | Bruno | ............. | G06Q 20/40145 |
| | | | | 705/44 |

* cited by examiner

BIOMETRIC AUTHENTICATED CONTENT

CROSS-REFERENCE TO RELATED APPLICATION(S)

This application is a continuation of U.S. patent application Ser. No. 15/177,758, filed Jun. 9, 2016, the entire disclosure of which is hereby incorporated by reference.

TECHNICAL FIELD

This disclosure relates to the field of content that is viewable only based on biometric authentication.

BACKGROUND

Content, such as text messages, are typically sent between people and are visible to the user of the phone, regardless of the particular user's authorization to view a message. In current SMS there is no means of connecting a message with a particular user, rather it is connected with a device. Third-party SMS messages such as WHATSAPP authenticate the user on a particular device, but the application and communications are then open to anyone who has access to view the device. Typically an app, once enabled and authenticated on a phone, remains viewable to anyone who has access to unlock the phone.

In any event, messages are not tied to particular users, rather the user id is tied to a user, so while the mailbox is tied to a user, individual messages cannot have a further layer of authentication to identify the actual person viewing the message, and cannot be differentially authenticated to different users, particularly within a group message setting.

Based on the foregoing, there is a need in the art for a messaging system that permits individual messages to be biometrically authenticated to individual viewers, rather than the owners of the general mailbox of the messaging application. Preferably, the biometric authentication is maintained periodically or the entire time that the authenticated content is being viewed.

SUMMARY

A method for biometric authentication has the steps of sending a confidential communication to an intended recipient through the system; the intended recipient providing one or more biometric identifiers to view the communication, wherein the one or more biometric identifiers are unique to the intended recipient, the system verifying the one or more biometric identifiers against one or more stored biometric identifiers, the system accepting the one or more biometric identifiers further has the steps of the system displaying the confidential communication on the mobile device, and the user continues to provide the one or more biometric identifiers, the system continuously verifying the one or more biometric identifiers while the communication is displayed wherein when the verification is uninterrupted or fails the communication is hidden.

In one embodiment, the method has the further steps of a user creating a profile, wherein the user inputs the one or more biometric identifiers during the profile creation; and the system storing the one or more biometric identifiers on a storage media.

In a further embodiment, the system may have the step of the system displaying a confidential communication transmission notification to indicate the receipt of a confidential communication.

The step of the user providing one biometric identifier may further comprise the user submitting a sequence of biometric identifiers. If the verification of the at least one biometric identifier fails, the messaging device performs an action selected from the group consisting of powering the messaging device down, displaying a non-confidential information, and displaying selected information, wherein the selected information is predetermined by the user. One or more biometric identifiers may be selected from the group consisting of fingerprints, voice prints, and facial features.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION

Figure 1A:
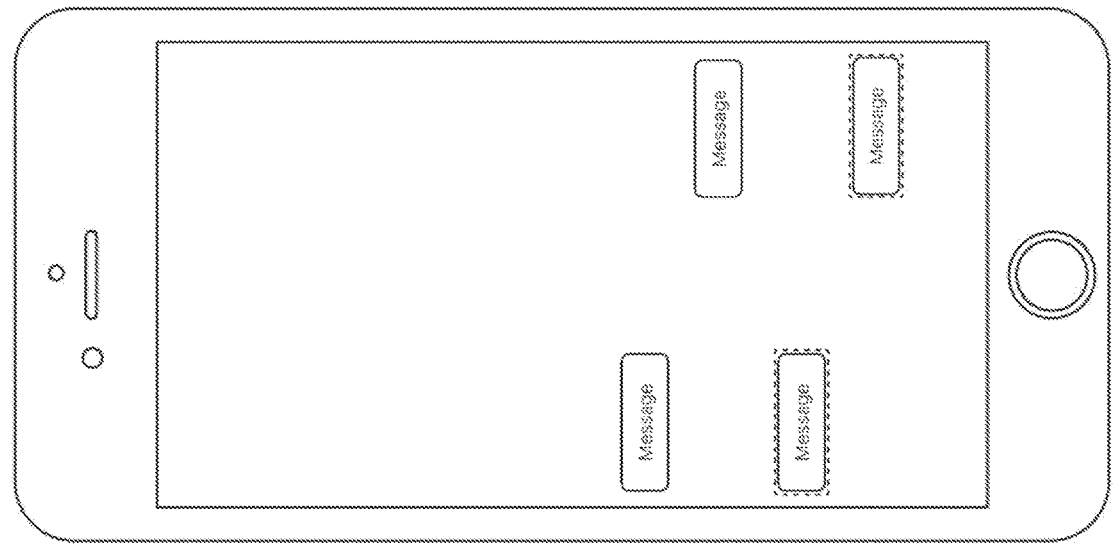
FIGS. 1A and 1B are example screenshots of the system in operation, according to an embodiment of the invention.
Figure 1B:
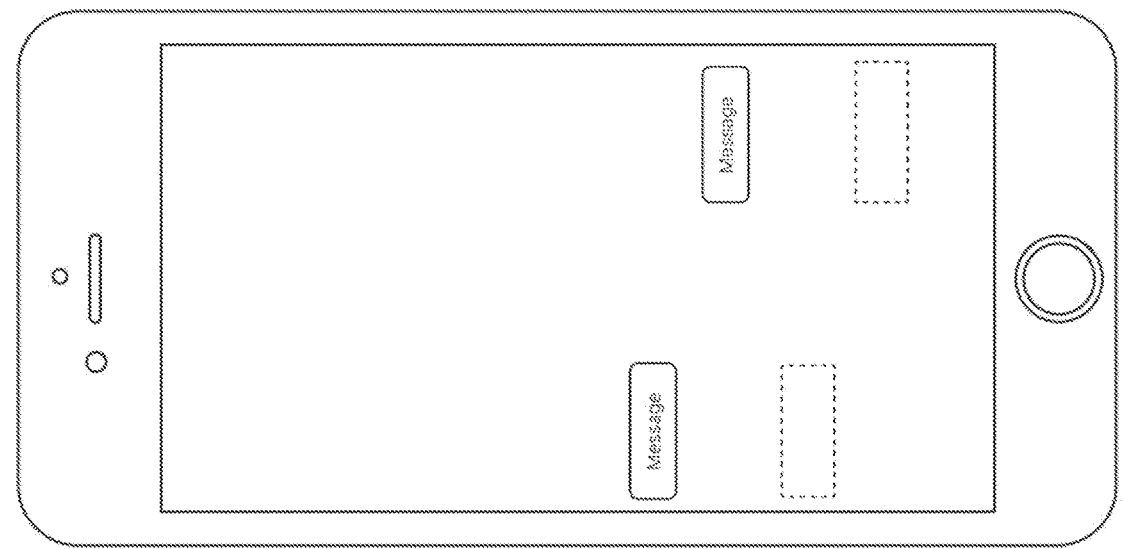
Figure 2:
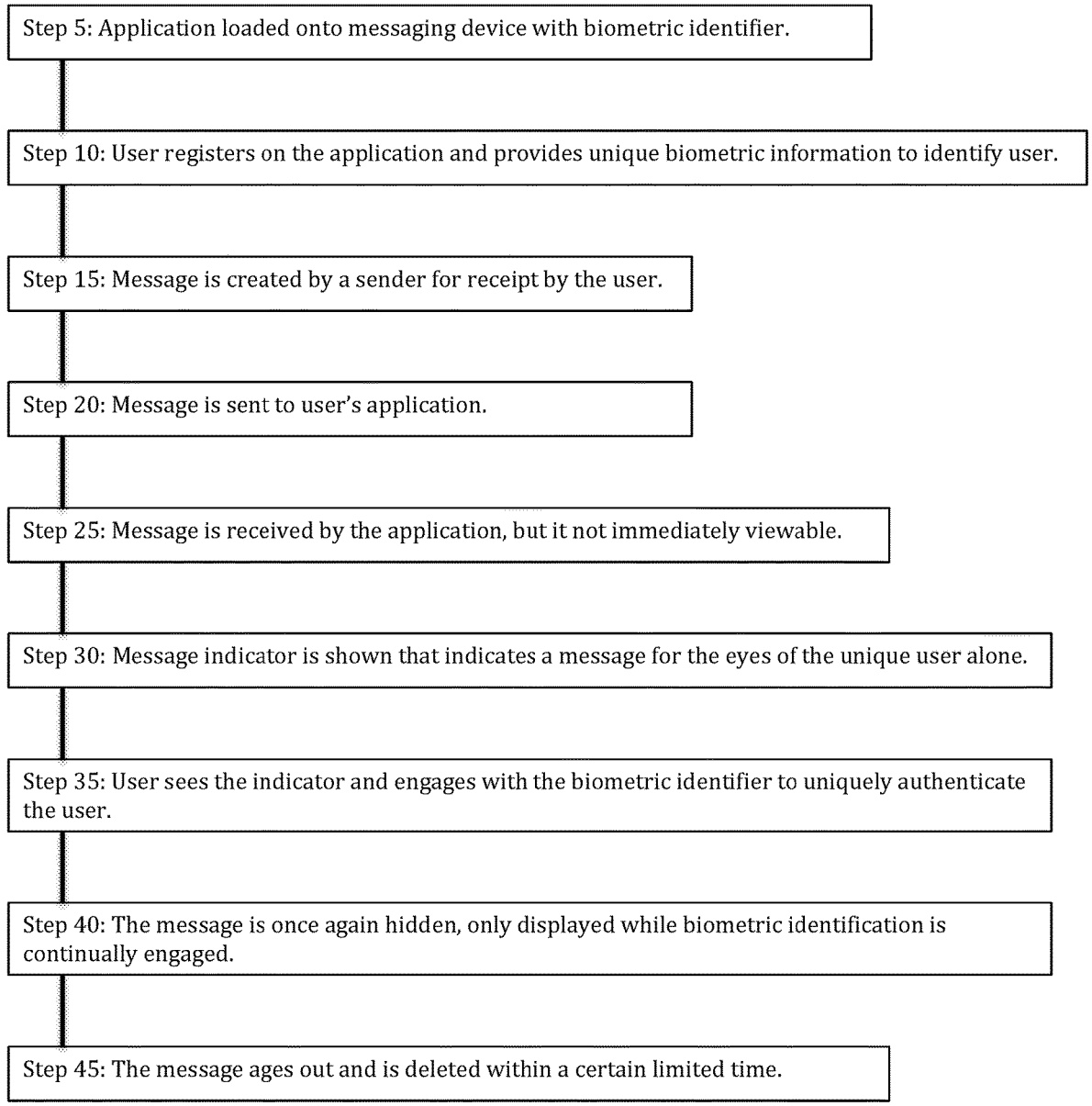
FIG. 2 is a flowchart showing the biometric messaging method, according to an embodiment of the present invention.

Preferred embodiments of the present invention and their advantages may be understood by referring to FIGS. 1-2, wherein like reference numerals refer to like elements.

In the present method, a biometric identification system is used to authenticate messages with the known presence of the particular user through continued authentication.

In step 5, the application is loaded onto a messaging device that has a biometric identifier. In step 10, the user registers on the application, and provides unique biometric information to uniquely identify the user for authentication purposes, which information is stored. In step 15, a message is created by a sender for receipt by the user, wherein the sender selects the user to be a unique recipient of the message, which is then linked to the unique user through a secure biometric library. In step 20, the message is sent to the user's application. In step 25, the message is received by the application, but is not immediately viewable. In step 30 a message indicator, such as a blank space in the conversation list, is shown that indicates a message for the eyes of the unique user alone. In step 35, the user sees the indicator and engages with the biometric identifier to uniquely authenticate the user. While the user is authenticated, the hidden message is displayed. Once the user disengages from the biometric identifier in step 40, the message is once again hidden, so it is only displayed while the biometric identification is continually engaged. In one embodiment, the hidden message is shown in the gap in the conversation, which forms the indicator. In step 45, the message ages out and is deleted within a certain limited time.

The biometric identifier may comprise a fingerprint scanner, a retina scanner, facial recognition features of the camera, a voice authorization system or other recognition system that is able to uniquely identify a user through biometrics.

In an embodiment, the recipient user 1s known within the system and selectable through a list of know user connection. In an alternative embodiment, the recipient user is not within the known list. The unknown user receives a notification whereby the system provides a unique invitation to the recipient device for establishing a local system on the recipient user device. When the local system is established, the recipient user then provides the stored biometric authentication to the system. The system verifies the supplied biometric authentication against a set of established, and initially provided biometric identifiers.

In an embodiment, the message indicator is inconspicuous and is provided by the system to mimic standard functionally of the device, while the user is aware of the possible indicator. For example, the system provides an altered font or color of font for exiting indicators such as the battery meter of the device, as the message indicator. In another example, the system displays one or more images such as pictures or news articles that are known to the user to indicate a pending message. After the message indicator is received, the user then engages the system to authenticate their identity and view the pending messages.

In an embodiment, authorization requires the combination of two or more biometric verification platforms. For example, a user is required to provide tactile verification in combination with vocal sample. The system establishes an appropriate sequence of biometric inputs for authorization through the biometric database and the user-established inputs. In another embodiment, the sequence of required biometric input has a time sensitive attribute whereby the time sequence is established as the time between the user initiated start of sequence input to the time of entry for the final input. In another embodiment, if the sequence is input correctly or the time has elapsed after multiple attempts, the system will provide an altered or secondary sequence required to remove the system from a locked-out mode to operational status. As an illustrative example of the sequence layers of authorization, upon initial system setup, a user selects multi-level sequence authorization. The user further establishes a sequence within the system or selects automatic sequence options presented by the system. Once the sequence is established, for example tactile in combination with voice and facial recognition, the user verifies the appropriate input for each layer and the sequence is then maintained within the system.

In another embodiment, the tactile sequencing involves the user contacting the device with different fingerprints in a unique sequence. Fingerprints are initially stored within the system to correspond with the appropriate user. For example, the sequence may be for the user to first place their first digit, then third digit, then first digit, then fourth digit and hold for a period of five seconds.

In an alternative embodiment, the identification system operates under pseudo-authorized conditions. A pseudo-authorization is a process wherein the system establishes variables to be input by a user whereby the variables are components to the authorization algorithm. The variables include existing biometric platforms. However, when presented in a specific combination detailed by the unique algorithm established by the system, specific to the system user, the system will initiate under pseudo-authorized protocols. As a physical barrier safeguard, the system operates under these protocols to present only select data and information. In another embodiment, the user established a separate set of information to be presented within the system as a facade under the pseudo-authorization protocols.

The system has a capability of receiving the geo-location of the device and may map this location to the message. The geolocation may be triggered by the engagement of the biometrics. Further, the messages may comprise video or audio messages. Live video or audio may also be revealed once the biometric identification are engaged and maintained. The biometric identification may also by used to unlock hidden folders for the authorized user and sharing of files may be permitted by the biometric identification. While the biometric authorization is maintained, the folders selected to be secret are available to the user. When the biometric authorization ceases, standard operation of the device resumes allowing for general access to generic device functionality. The sender may select different levels of security to determine how long a message or file is revealed based on a successful authentication.

In an embodiment, the different levels of security are maintained within the same local system. The local system allows for access to specified levels of security based on the different biometric input. For example, different levels of security are achieved by the duration of authentication, the sequence of authentication, or the specific authorized user inputting the biometric identifier.

In an alternative embodiment, a user establishes the local system whereby the user inputs various biometric identifiers. When this user engages the system, the biometric identifiers are matched against the established identifiers from the initial system setup. When an unauthorized user attempts to access the device through engaging one or more biometric sensors or one or more buttons on the device, the device will remain inoperable as if the power source of the device is depleted. As a security measure, the appropriate user may select additional security to allow for the misconception that the device does not have enough battery power to operate.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A method, comprising:
   receiving a request from a user to access an electronic communication, the request including one or more biometric identifiers associated with the user;
   verifying the one or more biometric identifiers against one or more previously stored biometric identifiers;
   displaying the electronic communication for an amount of time, the amount of time ending when verification fails resulting in the electronic communication being hidden; and
   providing varying levels of access to the electronic communication based on a sequence of the one or more biometric identifiers, a duration of the verification and identification information that is associated with the user and that is distinct from the one or more biometric identifiers.

2. The method of claim 1, further comprising:
   receiving the electronic communication from another user, the electronic communication including confidential information.

3. The method of claim 1, wherein the sequence of the one or more biometric identifiers comprises a sequence of two or more biometric identifiers.

4. The method of claim 1, wherein the varying levels of access to the electronic communication are provided based on additional information associated with the user.

5. The method of claim 1, further comprising:
   receiving user profile information from the user, the user profile information including the one or more biometric identifiers; and storing the user profile information in storage media to provide the one or more previously stored biometric identifiers.

6. The method of claim 1, further comprising:
displaying, to the user, a transmission notification associated with the electronic communication to indicate receipt of the electronic communication.

7. The method of claim 1, wherein receiving the one or more biometric identifiers from the user comprises receiving the sequence of the one or more biometric identifiers from the user.

8. The method of claim 1, wherein when the verification fails, further comprising:
performing an action comprising any of powering down a messaging device associated with the user, displaying non-confidential information to the user, and displaying selected information that is predetermined by the user.

9. The method of claim 1, wherein the one or more biometric identifiers comprise any of fingerprints, voice prints, retina features, and facial features.

10. A system, comprising:
a memory; and
a processor configured to execute instructions stored in the memory to:
receive a request from a user to access an electronic communication, the request including one or more biometric identifiers associated with the user;
verify the one or more biometric identifiers against one or more previously stored biometric identifiers;
display the electronic communication for an amount of time, the amount of time ending when verification fails resulting in the electronic communication being hidden; and
provide varying levels of access to the electronic communication based on a sequence of the one or more biometric identifiers, a duration of the verification and identification information that is associated with the user and that is distinct from the one or more biometric identifiers.

11. The system of claim 10, the processor being further configured to execute instructions stored in the memory to:
receive the electronic communication from another user, the electronic communication including confidential information.

12. The system of claim 11, wherein the confidential information comprises one or more data file folders.

13. The system of claim 10, wherein the sequence of the one or more biometric identifiers comprises a sequence of two or more biometric identifiers.

14. The system of claim 10, wherein the varying levels of access to the electronic communication are provided based on additional information associated with the user.

15. The system of claim 10, wherein the one or more biometric identifiers comprise any of fingerprints, voice prints, retina features, and facial features.

16. The system of claim 10, wherein when the sequence is input incorrectly or a predetermined time period has elapsed, the processor is further configured to execute instructions stored in the memory to:
provide another sequence required to remove a messaging device associated with the user from a locked-out mode and back to an operational mode.

17. The system of claim 16, wherein the processor is further configured to execute instructions stored in the memory to:
receive a geo-location of the messaging device and map the geo-location to the electronic communication.

18. The system of claim 10, wherein the processor is further configured to execute instructions stored in the memory to:
verify one or more pseudo-authorized conditions comprising variables associated with an authorization algorithm.

19. The system of claim 10, wherein when the verification fails, the processor is further configured to execute instructions stored in the memory to:
perform an action comprising any of powering down a messaging device associated with the user, displaying non-confidential information to the user, and displaying selected information that is predetermined by the user.

20. A non-transitory computer-readable storage medium including instructions that when executed cause a processor to perform operations including:
receiving a request from a user to access an electronic communication, the request including one or more biometric identifiers associated with the user;
verifying the one or more biometric identifiers against one or more previously stored biometric identifiers;
displaying the electronic communication for an amount of time, the amount of time ending when verification fails resulting in the electronic communication being hidden; and
providing varying levels of access to the electronic communication based on a sequence of the one or more biometric identifiers, a duration of the verification and identification information that is associated with the user and that is distinct from the one or more biometric identifiers.

* * * * *